P. J. MIX.
TIRE.
APPLICATION FILED SEPT. 18, 1918.

1,288,960.

Patented Dec. 24, 1918.
2 SHEETS—SHEET 1.

Inventor
P. J. Mix
By Watson E. Coleman
Attorney

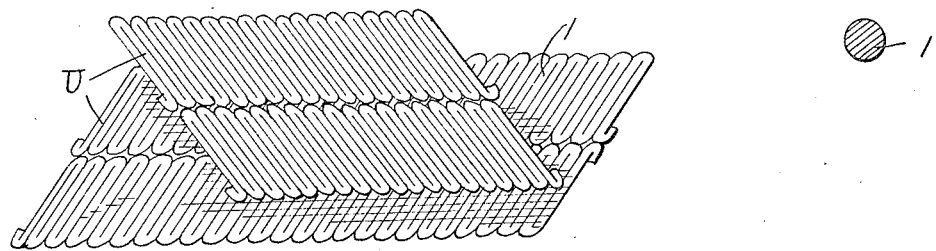
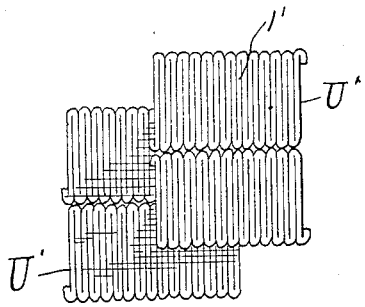
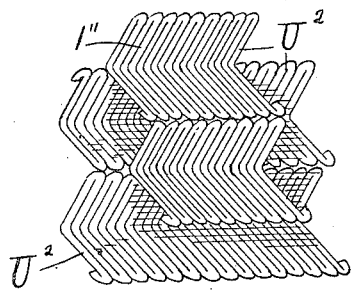
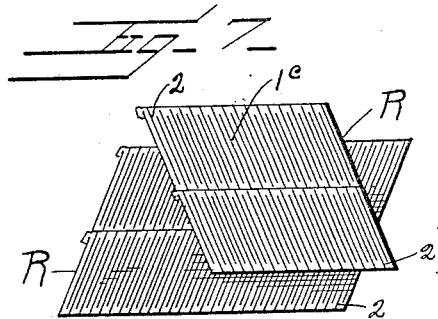
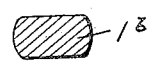

UNITED STATES PATENT OFFICE.

PHILIP J. MIX, OF BOULDER, COLORADO, ASSIGNOR OF ONE-HALF TO DORSE E. HOAGLAND, OF BOULDER, COLORADO.

TIRE.

1,288,960.

Specification of Letters Patent.  Patented Dec. 24, 1918.

Application filed September 18, 1918.  Serial No. 254,556.

*To all whom it may concern:*

Be it known that I, PHILIP J. MIX, a citizen of the United States, residing at Boulder, in the county of Boulder and State of Colorado, have invented certain new and useful Improvements in Tires, of which the following is a specification, reference being had to the accompanying drawings.

This invention relates to certain improvements in tires, and has relation more particularly to a device of this general character of a pneumatic type, and it is an object of the invention to provide the tread portion of the tire with a novel and improved armor whereby the possibility of the puncturing of the tire is materially reduced.

It is also an object of the invention to provide a tire with a novel and improved internal armor, and wherein said armor possesses flexibility so that no interference or obstruction will be offered by the armor to the functioning of the tire.

The invention consists in the details of construction and in the combination and arrangement of the several parts of my improved tire whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:

Fig. 3 is a fragmentary view in top plan of the internal armor as employed in the embodiment of my invention as particularly illustrated in Figs. 1 and 2;

Fig. 4 is an enlarged transverse sectional view of one of the strands as employed in the armor and as particularly illustrated in Fig. 3;

Fig. 5 is a fragmentary view in top plan illustrating an armor constructed in accordance with a further embodiment of my invention;

Fig. 6 is a fragmentary view in top plan of an armor constructed in accordance with another embodiment of my invention;

Fig. 7 is a fragmentary view in top plan of an armor constructed in accordance with a still further embodiment of my invention;

Fig. 8 is a transverse sectional view taken through one of the ribbons or units included in the form of invention illustrated in Fig. 7;

Fig. 9 illustrates in section the cross sectional configuration which may be given to the strands embodied in the forms of invention particularly illustrated in Figs. 3 to 6 inclusive; and Fig. 10 illustrates another cross sectional configuration which may be given to the strands as embodied in the forms of invention also particularly illustrated by Figs. 3 to 6 inclusive.

Figure 1:
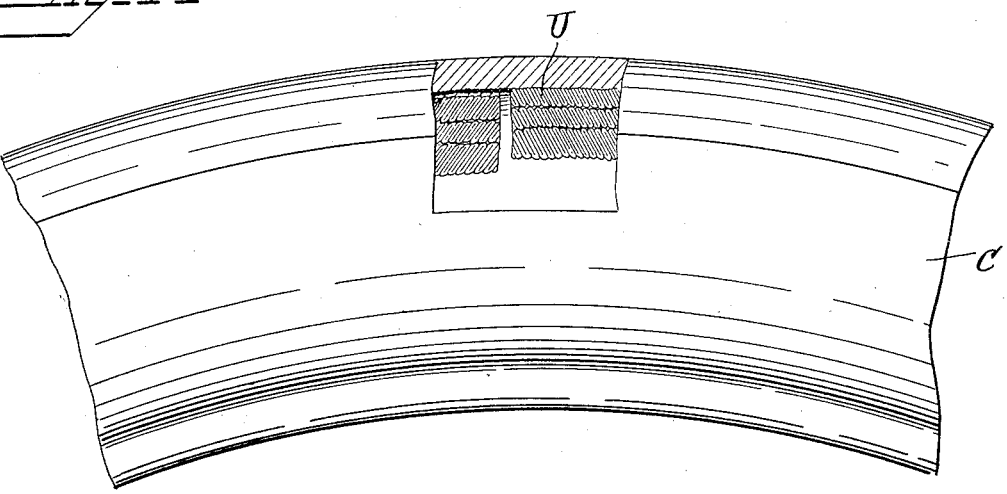
Figure 1 is a fragmentary view in elevation of a portion broken away of a tire constructed in accordance with the embodiment of my invention.
Figure 2:
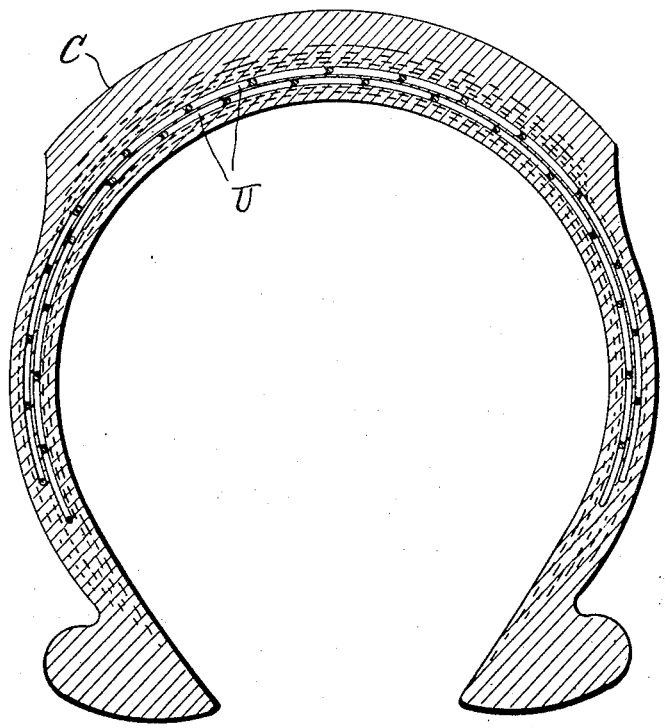
Fig. 2 is an enlarged, transverse, sectional view taken through the tire as disclosed in Fig. 1.

As particularly illustrated in Figs. 1 to 4 inclusive, C denotes a casing or carcass of a pneumatic tire of a conventional type and embedded within the tread portion thereof is an internal armor arranged in accordance with an embodiment of my invention.

In this embodiment of my invention, my improved armor comprises two series of units in superimposed relation with a slight separation between the series. The units of one series overlap the units of the second series so that the tread portion of the casing or carcass C is rendered substantially puncture-proof.

Each of the units U comprises a single strand of wire returned upon itself to afford transversely disposed portions or arms 1 substantially in parallelism with adjacent portions or arms also substantially in contact throughout their lengths. Each of the units U may also be termed a ribbon and is annular in form and for which reason the ends of the strand from which said unit or ribbon is formed may be welded or otherwise permanently secured to each other.

The units U of each series are arranged side by side and the arms or portions 1 of one series of units is reversely directed relative to the arms or portions 1 of the second series, as is particularly illustrated in Fig. 3 of the accompanying drawings. It is also preferred that each of the strands be circular in cross section as is disclosed in Fig. 4, although if preferred said strand 1ª may be substantially square in cross section as set forth by Fig. 9, or the strand 1$^b$ may be substantially oblong in cross section as disclosed in Fig. 10.

The arms or portions 1 result in the unit or ribbon U being resilient or pliable which readily permits the requisite flexibility of the tread portion or carcass C, yet at the same time maintains said portion of the casing or carcass substantially puncture-proof.

In the embodiment of my invention illustrated in Fig. 5, the units U' are arranged in substantially the same manner as has been set forth relative to the unit U, but the arms or portions 1' are disposed substantially at right angles to the longitudinal axis of each of the units or ribbons U'. The units U$^2$ are also arranged in substantially the same manner as has hereinbefore been set forth relative to the units or ribbons U, but the arms or portions 1'' are substantially V-shaped in cross section with the apices extending in substantially the same direction.

In the form of my invention illustrated in Fig. 7 each of the units or ribbons R is formed of a flat thin metallic plate, preferably steel, and possessing inherent resiliency, and each of said plates is provided with the slits 2 extending inwardly thereof from the opposite longitudinal margins of the ribbon or unit and in alternate relation. The slits 2 result in the resilient arms or portions 1$^c$ which function in substantially the same manner as has hereinbefore been particularly set forth relative to the arms or portions 1.

From the foregoing description, it is thought to be obvious that a tire constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. An internal armor for the carcass of a pneumatic tire comprising a plurality of series of units in superimposed relation with a slight separation therebetween, the units of each series being arranged side by side, each of the units of one series overlapping adjacent units of a successive series, each unit consisting of a plurality of transversely disposed and independently movable resilient metallic arms, said units being maintained in assembled relation wholly by the material of the casing.

2. An internal armor for the carcass of a pneumatic tire comprising a plurality of series of units in superimposed relation with a slight separation therebetween, the units of each series being arranged side by side, each of the units of one series overlapping adjacent units of a successive series, each unit consisting of a plurality of transversely disposed and independently movable resilient metallic arms, said units being maintained in assembled relation wholly by the material of the casing, each of said units being formed of a single strand of metal returned upon itself to provide the resilient arms.

3. An internal armor for the carcass of a pneumatic tire comprising a plurality of series of units in superimposed relation with a slight separation therebetween, the units of each series being arranged side by side, each of the units of one series overlapping adjacent units of a successive series, each unit consisting of a plurality of transversely disposed and independently movable resilient metallic arms, said units being maintained in assembled relation wholly by the material of the casing, the arms of each of the units being obliquely disposed.

In testimony whereof I hereunto affix my signature in the presence of two witnesses.

PHILIP J. MIX.

Witnesses:
 HERSCHEL A. HACKER,
 PAUL W. BOHLER.